(12) United States Patent
Yanagisawa (10) Patent No.: US 7,988,298 B2
(45) Date of Patent: Aug. 2, 2011

(54) PROJECTOR HAVING A SHIFTED OR ROTATED OPTICAL AXIS

(75) Inventor: Hirotaka Yanagisawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 779 days.

(21) Appl. No.: 12/041,387

(22) Filed: Mar. 3, 2008

(65) Prior Publication Data
US 2008/0225238 A1 Sep. 18, 2008

(30) Foreign Application Priority Data
Mar. 16, 2007 (JP) ................... 2007-068105

(51) Int. Cl.
*G03B 21/00* (2006.01)
*G03B 21/14* (2006.01)
*G02F 1/1335* (2006.01)

(52) U.S. Cl. .................. 353/31; 353/33; 353/69; 349/7

(58) Field of Classification Search ........... 353/30–31, 353/33, 69–70, 81, 94, 98–99, 101, 122, 353/85; 359/651, 838; 349/5, 7–8, 10
See application file for complete search history.

(56) References Cited

U.S. PATENT DOCUMENTS

| | | | | |
|---|---|---|---|---|
| 5,237,399 A | * | 8/1993 | Inada et al. | 348/761 |
| 5,371,559 A | * | 12/1994 | San-Nohe et al. | 353/31 |
| 5,426,471 A | * | 6/1995 | Tanaka et al. | 348/745 |
| 7,220,003 B2 | * | 5/2007 | Eguchi | 353/30 |
| 2002/0060780 A1 | * | 5/2002 | Takezawa et al. | 353/53 |
| 2002/0141058 A1 | * | 10/2002 | Itoh | 359/487 |
| 2005/0052868 A1 | * | 3/2005 | Yamakawa | 362/269 |
| 2007/0258029 A1 | * | 11/2007 | Nakagawa et al. | 349/119 |

FOREIGN PATENT DOCUMENTS

| | | |
|---|---|---|
| JP | A-08-029766 | 2/1996 |
| JP | A 2002-162688 | 6/2002 |
| JP | A 2007-057810 | 3/2007 |
| JP | A-2007-225888 | 9/2007 |

* cited by examiner

*Primary Examiner* — Tony Ko
*Assistant Examiner* — Jori S Reilly-Diakun
(74) *Attorney, Agent, or Firm* — Oliff & Berridge, PLC (57) ABSTRACT

A projector includes a lighting optical system for emitting a lighting beam, a color separation/light guiding optical system for separating the lighting beam from the lighting optical system into optical paths for three colored light beams, a light modulation device provided for each of the colored light beams and for modulating the light beam, which is separated and guided to the optical path for each of the colored light beams by the color separation/light guiding optical system, in accordance with image information, a light beam combining optical system for combining the colored light beams each modulated by the light modulation device for each of the colored light beams, and a projection optical system for projecting the light beams output via the light beam combining optical system.

7 Claims, 4 Drawing Sheets

PROJECTOR HAVING A SHIFTED OR ROTATED OPTICAL AXIS

BACKGROUND

1. Technical Field

The present invention relates to a projector for projecting a composite image using a plurality of liquid crystal panels.

2. Related Art

There exists a device, as a projector, which separates a light source beam into three colors of light beams to light respective liquid crystal display devices for the respective colors, combines the light beams from the liquid crystal display devices for the respective colors, and projects the composite image on a screen with a projection lens (see JP-A-8-29766). In this projector, a light axis of a collimated light beam emitted from the light source section is arranged to have a certain elevation angle with a floor face, and the elevation angle is arranged to be the optimum viewing angle of the liquid crystal device.

However, in the projector as described above, there is a problem that the liquid crystal display device can hardly be used with the optimum viewing angle unless the liquid crystal display device is used with an elevation angle previously set therefor.

SUMMARY

Therefore, the invention has an advantage of providing a projector capable of exerting a performance thereof in accordance with the viewing angle characteristic of an individual liquid crystal display panel irrespectively of the elevation angle at which the projector is used.

A projector according to an aspect of the invention includes (a) a lighting optical system for emitting a lighting beam, (b) a color separation/light guiding optical system for separating the lighting beam from the lighting optical system into optical paths for three colored light beams, (c) a plurality of light modulation devices for modulating each of the separated colored beams in accordance with image information, respectively, (d) a light beam combining optical system for combining the colored light beams each modulated by the light modulation devices, and (e) a projection optical system for projecting the light beams output via the light beam combining optical system. Further, in the projector, (f) the plurality of light modulation devices includes a normal view type light modulation device and a mirror image view type light modulation device, each of which have viewing angle characteristics laterally reversed from each other, (g) the colored light beam modulated by the normal view type light modulation device transmits through the light beam combining optical system, (h) the colored light beam modulated by the mirror image view type light modulation device is reflected by the light beam combining optical system and is laterally reversed, and (g) at least one optical element included in the lighting optical system and the color separation/light guiding optical system is shifted and/or rotated with respect to a system optical axis such that an average incident angle of the lighting beam to the normal view type light modulation device and an average incident angle of the lighting beam to the mirror image view type light modulation device are laterally reversed from each other. Here, "laterally" with respect to the viewing angle characteristic of the light modulation device and the incident angle of the lighting beam is assumed to denote two lateral directions when facing along the traveling direction of the light beam in an area on which attention is focused, assuming that one side of a reference plane, on which the system optical axis passing through the center of the image forming area of the light modulation device for each colored light beam is disposed, is defined as the upper side common to this optical system. It should be noted that although such a plane as described above through which the system optical axis passes is usually made identical to the horizontal plane based on the gravity, the invention is not limited to such a case.

In the projector described above, the normal view type light modulation device and the mirror image view type light modulation device have the viewing angle characteristics laterally reversed from each other, and an image combined by the light beam combining optical system is arranged to be what is obtained so as to consequently make the viewing angle characteristics identical with respect to the lateral direction, thus the light modulation devices for respective colored light beams are used while having a common characteristic. Further, since in the projector, the average incident angle of the lighting beam to the normal view type light modulation device and the average incident angle of the lighting beam to the mirror image view type light modulation device are laterally reversed from each other in accordance with the respective viewing angle characteristics, the light modulation devices for respective colored light beams can efficiently be lighted in accordance with the respective viewing angle characteristics, thus a bright and high-contrast image with reduced color shading and so on can be projected. On this occasion, it is only required that at least one optical element included in the lighting optical system or the color separation/light guiding optical system is shifted and/or rotated with respect to the system optical axis, thus the incident angle of the lighting beam can simply be adjusted.

According to a specific aspect or a view point of the invention, in the projector described above, the optical axis of the projection optical system is disposed so as to be shifted and/or rotated in an average emission direction of the light beams, which are each emitted from the light modulation device for each of the colored light beams and combined by the light beam combining optical system, with respect to the system optical axis passing through the center of an image forming area of the light modulating device for each of the colored light beams. According to the projector of this aspect of the invention, the average incident angle of the lighting beams is laterally inclined with respect to the system optical axis, and the main light beams from the light modulation devices for respective colored light beams are emitted so as to be laterally inclined with respect to the system optical axis. Therefore, by shifting or rotating the optical axis of the projection optical system in the average emission direction of the light beams passing through the light beam combining optical system and so on with respect to the system optical axis, the light beams can be projected without any loss.

According to another aspect of the invention, the light modulation device for each of the colored light beams is a liquid crystal light valve including a liquid crystal display panel. In this case, a high-quality image obtained by combining a plurality of relatively inexpensive liquid crystal display panels can stably be projected. It should be noted that although the liquid crystal display panel tends to have a viewing angle characteristic by a pretilt, the viewing angle characteristics of the normal view type light modulation device and the mirror image view type light modulation device are laterally reversed from each other, and the average incident angles of the lighting beams are laterally reversed from each other in accordance with the viewing angle characteristics, thus a high-quality image with reduced color shading and so on can be projected.

According to still another aspect of the invention, the lighting optical system includes a light source for emitting a light beam, a first lens array for dividing the light beam from the light source into a plurality of partial light beams, a second lens array for individually collecting the light beams from the first lens array, and an overlapping lens for overlapping the light beams from the second lens array on an image forming area of the light modulation device for each of the colored light beams, and optical axes of the light source, the first lens array, and the second lens array are shifted from the system optical axis passing through the center of the image forming area of the light modulation device for each of the colored light beams in the same direction. In this case, the average incident angles of the lighting beams to the light modulation devices for the respective colored light beams can be adjusted in accordance with the respective viewing angle characteristics with a simple configuration of only shifting an element such as the light source forming the lighting optical system in parallel to the system optical axis.

According to still another aspect of the invention, the lighting optical system includes a light source for emitting a light beam, a first lens array for dividing the light beam from the light source into a plurality of partial light beams, a second lens array for individually collecting the light beams from the first lens array, and an overlapping lens for overlapping the light beams from the second lens array on an image forming area of the light modulation device for each of the colored light beams, and optical axes of the light source, the first lens array, and the overlapping lens are shifted from the system optical axis passing through the center of the image forming area of the light modulation device for each of the colored light beams in the same direction. In this case, the average incident angles of the lighting beams to the light modulation devices for the respective colored light beams can be adjusted in accordance with the respective viewing angle characteristics with a simple configuration of only shifting an element such as the light source forming the lighting optical system in parallel to the system optical axis.

According to still another aspect of the invention, the color separation/light guiding optical system includes a plurality of mirrors, and a difference between the number of times of reflection of a light beam to the normal view type light modulation device and the number of times of reflection of a light beam to the mirror image view type light modulation device is arranged to be an odd number. In this case, the directions of the average incident angles of the lighting beams to the light modulation devices for the respective colored light beams can be made correspond to the respective viewing angle characteristics of the light modulation devices for the respective colored light beams only by inclining the lighting beams from the lighting optical system in a lump with respect to the system optical axis in the color separation/light guiding optical system in which a plurality of mirrors including the dichroic mirrors and so on are combined and disposed as usual without modifications.

According to still another aspect of the invention, the color separation/light guiding optical system includes a plurality of mirrors, and an average incident angle of the lighting beams to the normal view type light modulation device and an average incident angle of the lighting beams to the mirror image view type light modulation device are laterally reversed from each other in accordance with the respective viewing angle characteristics by rotating at least one of the plurality of mirrors with respect to the lateral direction. In this case, the average incident angles of the lighting beams to the light modulation devices for the respective colored light beams can be adjusted in accordance with the respective viewing angle characteristics with a simple configuration of only rotating at least one mirror forming the color separation/light guiding optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
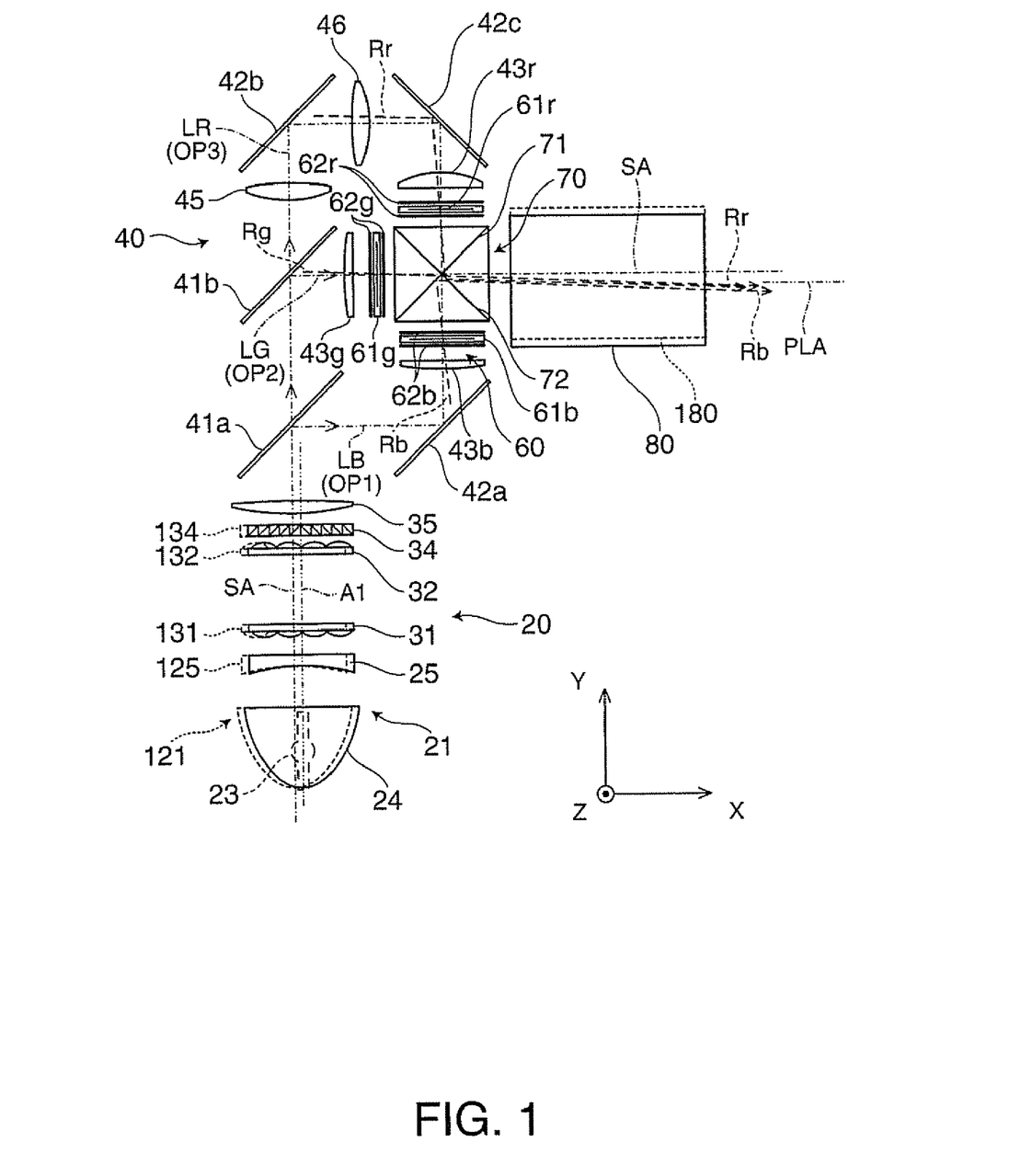
FIG. 1 is a schematic diagram showing an optical system of a projector according to a first embodiment of the invention.

FIG. 1 is a schematic diagram showing an optical system of the projector 10 according to the first embodiment of the invention. The projector 10 is an optical apparatus for modulating a light beam emitted from a light source in accordance with image information to form an optical image and enlargedly projecting the optical image on a screen, and is provided with a lighting optical system 20 for generating a lighting beam, a color separation/light guiding optical system 40 for dividing the lighting beam from the lighting optical system 20 into three colored light beams of red, green, and blue, a light modulation section 60 lighted by the lighting beams of respective colors emitted from the color separation/light guiding optical system 40, a cross dichroic prism 70 for combining the light beams of the respective colors from the light modulation section 60, and a projection optical system 80 for projecting the light beam passing through the cross dichroic prism 70 onto a screen (not shown).

In the projector 10 as described above, the lighting optical system 20 is provided with a light source lamp unit 21, first and second lens arrays 31, 32, a polarization conversion device 34, and an overlapping lens 35.

Out of these elements, the light source lamp unit 21 is a light source for emitting the lighting beam for lighting the light modulation section 60 via the color separation/light guiding optical system 40 and so on, and is provided with an arc tube 23 as a discharge emission lamp, a concave mirror 24 as an ellipsoidal reflector for reflecting the light source beam emitted from the arc tube 23, and a concave lens 25 for collimating the light source beam reflected by the concave mirror 24. The arc tube 23 is, for example, a high-pressure mercury lamp, and emits substantially white light. In this lighting optical system 20, the light source beam emitted from the arc tube 23 is collimated via the concave mirror 24 and the concave lens 25, and emitted forward, namely towards the color separation/light guiding optical system 40. It should be noted that various kinds of concave mirrors such as one with a paraboloidal surface can be used instead of the concave mirror 24 with an ellipsoidal surface described above. In the case of using the concave mirror with a paraboloidal surface, it becomes possible to emit a collimated light beam from the lighting optical system 20 without providing the concave lens 25 or the like in a subsequent stage of the concave mirror 24.

The first lens array 31 has a function of a beam splitting optical element for splitting the light beam emitted from the light source lamp unit 21 into a plurality of partial light beams, and is configured having a plurality of small lenses arranged in a matrix in a plane perpendicular to the system optical axis SA. A contour shape of each of the small lenses is arranged to be roughly similar to a shape of an image forming area of liquid crystal display panels 61b, 61g, and 61r forming the light modulation section 60 described later, namely a shape of a lighted area. The second lens array 32 is an optical element for collecting the plurality of partial light beams obtained by the splitting operation of the first lens array 31 described above, and is provided with a plurality of small lenses arranged in a matrix in a plane perpendicular to the system optical axis SA similarly to the first lens array 31. However, since the second lens array 32 is provided for collecting the light beam, it is not required for the contour shape of each of the small lenses to correspond to the shape of the image forming area of the liquid crystal display panels 61b, 61g, and 61r.

The polarization conversion device 34 is formed of a PBS array and a retardation plate, and has a role of aligning the polarization directions of the partial light beams, which are obtained by the splitting operation of the first lens array 31, into a linear polarization of a single direction. Although not shown in the drawings, the PBS array of the polarization conversion device 34 has a configuration of alternately arranging polarization splitting films and reflecting mirrors disposed at an angle with the system optical axis SA. The polarization splitting film, the former thereof, transmits either one polarization light beam out of a P-polarized light beam and a S-polarized light beam included in each of the partial light beams, and reflects the other polarization light beam. The other polarized light beam thus reflected is deflected by the reflecting mirror, the latter thereof, and then emitted in the emission direction of the one polarized light beam, namely in the direction along the system optical axis SA. Polarization conversion is executed by the retardation plate, which is provided on the light beam emission surface of the polarization conversion device 34 in a form of stripes, on either one of the polarized light beams thus emitted, thus the polarization directions of all of the polarized light beams are aligned. Since the light beam emitted from the light source lamp unit 21 can be aligned into the polarized light beam in one direction by using such a polarization conversion device 34, the efficiency of the light source beam used in the light modulation section 60 can be improved.

The overlapping lens 35 is an optical element for collecting the plurality of partial light beams passing through the first lens array 31, the second lens array 32, and the polarization conversion device 34, and making them enter the lighted area corresponding to the image forming areas of the liquid crystal display panels 61b, 61g, and 61r in an overlapping manner. The light beams emitted from the overlapping lens 35 are output to the color separation/light guiding optical system 40 in the subsequent stage while being equalized. In other words, the lighting beams passing through the both lens arrays 31, 32 and the overlapping lens 35 evenly light the lighted area of the light modulation section 60, namely the image forming areas of the liquid crystal display panels 61b, 61g, and 61r for respective colors in an overlapping manner.

In the lighting optical system 20 described above, the light source lamp unit 21, the first and second lens arrays 31, 32, and the polarization conversion device 34 are disposed at positions shifted from the system optical axis SA equally by the same distance in the same X direction. In other words, the optical axis A1 common to the light source lamp unit 21, the first and second lens arrays 31, 32, and the polarization conversion device 34 is shifted from the system optical axis SA by a predetermined distance in the +X direction. It should be noted that a light source lamp unit 121, first and second lens arrays 131, 132, and a polarization conversion device 134 illustrated with dotted lines denote a comparative example of a related-art type having optical axes identical to the system optical axis SA. In the present embodiment, the optical axis A1 common to the light source lamp unit 21, the first and second lens arrays 31, 32, and the polarization conversion device 34 is shifted to the right from the system optical axis SA (in the +X direction in this case) when facing along the traveling direction of the light beams assuming that the +Z side of the X-Y plane taken as a reference, in which the system optical axis SA is disposed, is an upper side common to all of the optical systems. As described above, by shifting the light source lamp unit 21 and so on from the system optical axis SA equally in the +X direction, eccentric light beams should enter the overlapping lens 35. Thus, there can be achieved a right-leaning condition (a condition in which the light beams are slightly inclined rightward on the light source side) in which the lighting beams emitted from the lighting optical system 20 are inclined or rotated counter-clockwise by a predetermined angle, and consequently, the average incident angle with the image forming area of the light modulation section 60 can be arranged to have a necessary amount in accordance with the viewing angle characteristic thereof, as described in detail later. Here, it is assumed that the +Z direction is an upper direction common to all of the optical systems, the +Y direction is light emission direction (parallel to the optical axis of the light source lamp unit 21) of the light source lamp unit 21 perpendicular to the Z direction, and the +X direction is a direction perpendicular to both the Z direction and the Y direction.

The color separation/light guiding optical system 40 is provided with first and second dichroic mirrors 41a, 41b, reflecting mirrors 42a, 42b, 42c, field lenses 43b, 43g, 43r, and relay lenses 45, 46. Out of these elements, the color separation optical system configured including the first and second dichroic mirrors 41a, 41b separates the lighting beam into three light beams, a blue (B) beam, a green (G) beam, and red (R) beam. The dichroic mirrors 41a, 41b are optical elements obtained by forming a dielectric multilayer film, which has a wavelength selection function of reflecting light beams in a predetermined wavelength range and transmitting light beams in another wavelength range, on a transparent substrate, and are equally inclined at an angle of 45° with respect to the system optical axis SA. The first dichroic mirror 41a reflects the blue beam LB out of the three colored beams of red, green, and blue (R, G, B) and transmits the green beam LG and the red beam LR. Further, the second dichroic mirror 41b reflects the green beam LG out of the incident green beam LG and red beam LR, and transmits the red beam LR. The field lenses 43b, 43g, and 43r for respective colors disposed on the emission side of the color separation/light guiding optical system 40 are provided so as to provide an appropriate convergence property or divergence property to each of the partial light beams emitted from the second lens array 32 and input to the light modulation section 60 with respect to the system optical axis SA. The pair of relay lenses 45, 46 are disposed on a third optical path OP3 for red which is relatively longer than a first optical path OP1 for blue or a second optical path OP2 for green. These relay lenses 45, 46 transmit an image formed right before the first relay lens 45 on the entrance side substantially directly to the field lens 43r on the emission side, thereby preventing efficiency drop of the light beam caused, for example, by divergence of the light beam.

In the color separation/light guiding optical system 40, the lighting beam input from the lighting optical system 20 via the lighting optical system 20 firstly enters the first dichroic mirror 41a. The blue beam LB reflected by the first dichroic mirror 41a is guided to the a first optical path OP1, and enters the field lens 43b in the final stage via the reflecting mirror 42a inclined at an angle of 45° with the system optical axis SA. Further, the green beam LG transmitted through the first dichroic minor 41a and reflected by the second dichroic mirror 41b is guided to the second optical path OP2 to enter the field lens 43g in the final stage. Still further, the red beam transmitted through the second dichroic mirror 41b is guided to the third optical path OP3, and enters the field lens 43r in the final stage via the reflecting mirrors 42b, 42c inclined at an angle of 45° with the system optical path SA and the relay lenses 45, 46.

The light modulation section 60 is provided with three liquid crystal display panels 61b, 61g, and 61r to which the three colored lighting beams LB, LG, and LR are respectively input, and three sets of polarization filters 62b, 62g, and 62r disposed so as to hold the respective liquid crystal display panels 61b, 61g, and 61r therebetween. Here, the liquid crystal display panel 61b for blue beam LB and the pair of polarization filters 62b, 62b holding the liquid crystal display panel 61b therebetween, for example, form a liquid crystal light valve for executing two-dimensional intensity modulation on the lighting beam based on image information. Similarly, the liquid crystal display panel 61g for the green beam LG and the corresponding polarization filters 62g, 62g also form a liquid crystal light valve, and the liquid crystal display panel 61r for the red beam LR and the corresponding polarization filters 62r, 62r also form a liquid crystal light valve. Although not shown specifically in the drawings, each of the liquid crystal display panels 61b, 61g, and 61r is, for example, a twisted nematic transmissive liquid crystal panel having a structure of hermetically encapsulating liquid crystal molecules between a TFT substrate and an opposed substrate, and modulates the polarization direction of the polarized light beam respectively input thereto in accordance with an image signal provided thereto using a polysilicon TFT as a switching device.

In the light modulation section 60, the blue beam LB guided to the first optical path OP1 enters the image forming area disposed at a position of the liquid crystal display panel 61b via the field lens 43b, thus lighting the image forming area inside the liquid crystal display panel 61b. The green beam LG guided to the second optical path OP2 enters the image forming area disposed at a position of the liquid crystal display panel 61g via the field lens 43g, thus lighting the image forming area inside the liquid crystal display panel 61g. The red beam LR guided to the third optical path OP3 enters the image forming area disposed at a position of the liquid crystal display panel 61r via the first and second relay lenses 45, 46, and the field lens 43r, thus lighting the image forming area inside the liquid crystal display panel 61r. Each of the liquid crystal display panels 61b, 61g, and 61r is a non-light emitting and transmissive light modulation device for varying the spatial distribution of the polarization direction of the incident lighting beam. The colored beams LB, LG, and LR respectively entering the liquid crystal display panels 61b, 61g, and 61r are adjusted in the polarization state by pixel in accordance with drive signals or control signals input as electrical signals to the respective liquid crystal display panels 61b, 61g, and 61r. On this occasion, the polarization direction of the lighting beam to be input to each of the liquid crystal display panels 61b, 61g, and 61r is adjusted by the respective one of the polarization filters 62b, 62g, and 62r, and at the same time, a modulated beam with a predetermined polarization direction is taken out from the light beam emitted from the respective one of the liquid crystal display panels 61b, 61g, and 61r.

Figure 2A:
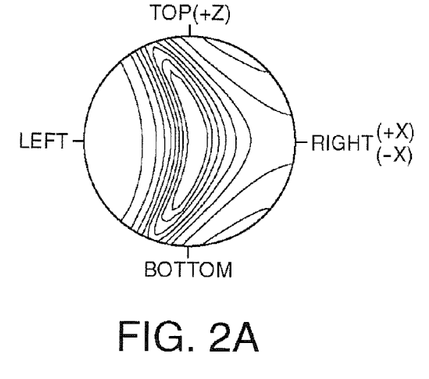
FIGS. 2A and 2B are graphs for explaining a view angle characteristic of each of liquid crystal display panels.
Figure 2B:
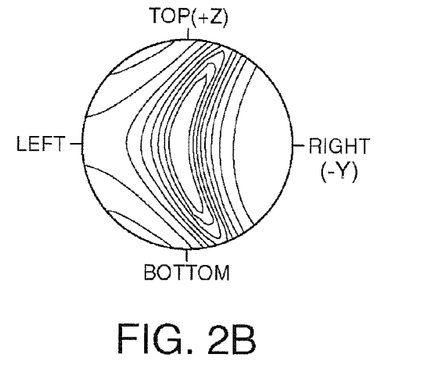

FIGS. 2A and 2B show graphs for explaining the viewing angle characteristic of each of the liquid crystal display panels 61b, 61g, and 61r forming the light modulation section 60. FIG. 2A exemplifies the viewing angle characteristic of each of the liquid crystal display panels 61b, 61r for blue and red, respectively, and FIG. 23 exemplifies the viewing angle characteristic of the liquid crystal display panel 61g for green.

As shown in FIG. 2A, the liquid crystal display panels 61b, 61r for blue and red, respectively, have right-leaning viewing angle characteristics. Here, the right-leaning with respect to the viewing angle characteristic of the liquid crystal display panel 61b for blue denotes that when the liquid crystal display panel 61b is viewed from the light beam entrance side thereof in a direction along the system optical axis SA, the contrast increases if the incident light beam to the image forming area of the liquid crystal display panel 61b is inclined rightward (on the +X side) at a predetermined small angle. Similarly, the right-leaning with respect to the viewing angle characteristic of the liquid crystal display panel 61r for red denotes that when the liquid crystal display panel 61r is viewed from the light beam entrance side thereof in a direction along the system optical axis SA, the contrast increases if the incident light beam to the image forming area of the liquid crystal display panel 61r is inclined rightward (on the −X side) at a predetermined small angle. It should be noted that the both liquid crystal panels 61b, 61r are each a liquid crystal panel in which the rubbing direction of the TFT substrate is rotated 90 degrees leftwards (counterclockwise) taking the rubbing direction of the opposed substrate as a reference to set the liquid crystal molecules to be left handed, and each have the right-leaning viewing angle characteristic described above owing to the pretilt of the liquid crystal existing in the vicinity of the oriented film.

On the other hand, as shown in FIG. 2B, the liquid crystal display panel 61g for green has a left-leaning viewing angle characteristic. Here, the left-leaning with respect to the viewing angle characteristic of the liquid crystal display panel 61g for green denotes that when the liquid crystal display panel 61g is viewed from the light beam entrance side thereof in a direction along the system optical axis SA, the contrast increases if the incident light beam to the image forming area of the liquid crystal display panel 61g is inclined leftward (on the +Y side) at a predetermined small angle. It should be noted that the liquid crystal panel 61g in FIG. 23 is a different type of liquid crystal panel from the liquid crystal display panels 61b, 61r shown in FIG. 2A, in which the rubbing direction of the TFT substrate is rotated 90 degrees rightwards (clockwise) taking the rubbing direction of the opposed substrate as a reference to set the liquid crystal molecules to be right handed, and has the left-leaning viewing angle characteristic described above owing to the pretilt of the liquid crystal existing in the vicinity of the oriented film.

Figure 3A:
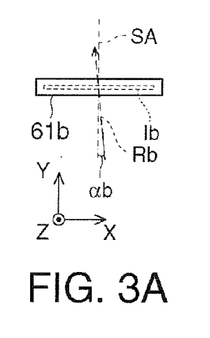
FIGS. 3A through 3C are diagrams for explaining conditions of lighting beams entering the respective liquid crystal panels.
Figure 3B:
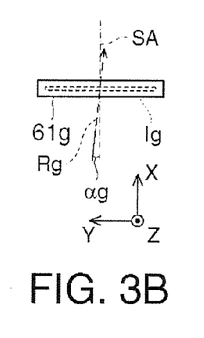
Figure 3C:
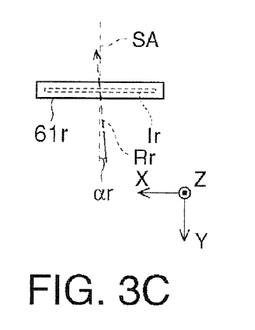

FIGS. 3A through 3C are diagrams for explaining conditions of lighting beams entering the respective liquid crystal panels 61b, 61g, and 61r. A representative beam Rb in the right-leaning condition is made enter the image forming area Ib of the liquid crystal display panel 61b for blue shown in FIG. 3A using the shift of the light source lamp unit 21 and so on. The representative beam Rb enters the image forming area Ib at an incident angle corresponding to an average incident angle αb (a predetermined small angle at which it is inclined rightwards (on the +X side) towards the image forming area Ib when the liquid crystal display panel 61*b* is viewed from the light beam entrance side thereof in a direction along the system optical axis SA) of the blue beam LB with the image forming area Ib. A representative beam Rg in the left-leaning condition is made enter the image forming area Ig of the liquid crystal display panel 61*g* for green shown in FIG. 33 using the shift of the light source lamp unit 21 and so on. The representative beam Hg enters the image forming area Ig at an incident angle corresponding to an average incident angle αg (a predetermined small angle at which it is inclined leftwards (on the +Y side) towards the image forming area Ig when the liquid crystal display panel 61*g* is viewed from the light beam entrance side thereof in a direction along the system optical axis SA) of the green beam LG with the image forming area Ig. A representative beam Rr in the right-leaning condition is made enter the image forming area Ir of the liquid crystal display panel 61*r* for red shown in FIG. 3C using the shift of the light source lamp unit 21 and so on. The representative beam Hr enters the image forming area Ir at an incident angle corresponding to an average incident angle αr (a predetermined small angle at which it is inclined rightwards (on the −X side) towards the image forming area Ir when the liquid crystal display panel 61*r* is viewed from the light beam entrance side thereof in a direction along the system optical axis SA) of the red beam LR with the image forming area Ir.

It should be noted that in the color separation/light guiding optical system 40 shown in FIG. 1, the number of times of reflection (specifically, the reflection by the mirrors 41*a*, 42*a* in the optical path OP1, and the reflection by the mirrors 42*b*, 42*c* in the optical path OP3) of each of the light beams in the optical paths OP1, OP3 to the liquid crystal display panels 61*b*, 61*r*, respectively, lighted in the right-leaning condition is two, which is an even number, while the number of times of reflection (specifically, the reflection by the mirror 41*b* in the optical path OP2) of the light beam in the optical path OP2 to the liquid crystal panel 61*g* lighted in the left-leaning condition is one, which is an odd number. In other words, the difference between the number of times of reflection in each of the optical paths OP1, OP3 to the respective liquid crystal panels 61*b*, 61*r*, and the number of times of reflection in the optical path OP2 to the liquid crystal panel 61*g* is an odd number. Thus, even in the case in which the shift of the light source including all of the colors in a lump is performed using the shift of the light source lamp unit 21 and so on, which one of the right-leaning condition and the left-leaning condition is used for lighting the liquid crystal display panels 61*b*, 61*g*, and 61*r* can be simply set in accordance with the number of times of reflection in the optical path.

The cross dichroic prism 70 is a light beam combining optical system for combining the beams separately modulated as the respective colored beams and emitted respectively from the polarization filters 62*b*, 62*g*, and 62*r* on the emission side, and forming a color image. The cross dichroic prism 70 has a substantially rectangular planar shape formed of four rectangular prisms bonded with each other, and on the interfaces on which the rectangular prisms are bonded with each other, there are formed a pair of dielectric multilayer films 71, 72 intersecting with each other forming an X shape. One of the pair of dielectric multilayer films, the first dielectric multilayer film 71, reflects the blue beam while the other of the pair of dielectric multilayer films, the second dielectric multilayer film 72, reflects the red beam. The cross dichroic prism 70 reflects the blue beam LB from the liquid crystal display panel 61*b* with the first dielectric multilayer film 71 to emit the blue beam rightward in the traveling direction, transmits the green beam LG from the liquid crystal display panel 61*g* to emit the green beam straight through the first and second dielectric multilayer films 71, 72, and reflects the red beam DR from the liquid crystal display panel 61*r* with the second dielectric multilayer film 72 to emit the red beam leftward in the traveling direction.

As described above, the light beams combined by the cross dichroic prism 70 are projected on a screen (not shown) as a color image at an appropriate enlargement ratio via the projection optical system 80 as an enlargedly projecting lens.

Figure 4A:
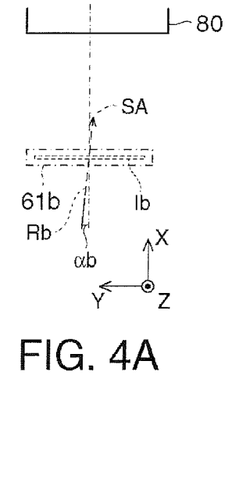
FIGS. 4A through 4C are diagrams for explaining conditions of light beams emitted from the respective liquid crystal panels.
Figure 4B:
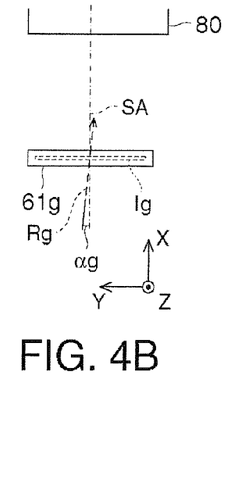
Figure 4C:
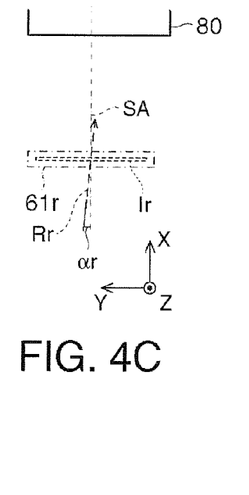

FIGS. 4A through 4C are diagrams for explaining incidence of the light beams via the cross dichroic prism 70 to the projection optical system 80. The liquid crystal display panel 61*b* for blue shown in FIG. 4A is a mirror image view type light modulation device, and is shown as a virtual image viewed as a mirror image by the first dielectric multilayer film 71. The liquid crystal display panel 61*b* emits the representative beam Rb corresponding to the left-leaning condition having the average incident angle αb with a sign reversed from that shown in FIG. 3A. The liquid crystal display panel 61*g* for green shown in FIG. 4B is a normal view type light modulation device, and is shown as an actual image directly passing through the cross dichroic prism 70. The liquid crystal display panel 61*g* emits the representative beam Rg corresponding to the left-leaning condition with the same average incident angle αg shown in FIG. 3B. The liquid crystal display panel 61*r* for red shown in FIG. 4C is a mirror image view type light modulation device, and is shown as a virtual image viewed as a mirror image by the second dielectric multilayer film 72. The liquid crystal display panel 61*r* emits the representative beam Rr corresponding to the left-leaning condition having the average incident angle αr with a sign reversed from that shown in FIG. 3C. As is clear from FIGS. 3A through 3C described above, the representative beams Rb, Rg, and Rr of the respective colors entering the projection optical system 80 are in a condition of being inclined at the same angles of αb, αg, and αr with the system optical axis SA in the same direction. Therefore, the projection optical system 80 is shifted from the system optical axis SA, thus forming a condition in which the optical axis PLA of the projection optical system 80 is shifted in parallel by an appropriate distance to the right of the system optical axis SA. Thus, the images of the respective liquid crystal display panels 61*b*, 61*g*, and 61*r* can be projected on the screen with small defocus and distortion. It should be noted that the projection optical system 180 illustrated with dotted line in FIG. 1 shows a comparative example of the related art with an optical axis identical to the system optical axis SA.

In the projector 10 as described hereinabove, the mirror image view type liquid crystal display panel 61*b*, 61*r* and the normal view type liquid crystal display panel 61*g* have the viewing angle characteristics laterally reversed from each other, the image combined by the cross dichroic prism 70 is consequently obtained so as to have the viewing angle characteristic identical with respect to the lateral direction, and the liquid crystal display panels 61*b*, 61*g*, and 61*r* for respective colors are used in a condition of having a common characteristic. Further, in the present projector 10, since the average incident angles of the lighting beams to the mirror image view type liquid crystal display panel 61*b*, 61*r* and the normal view type liquid crystal display panel 61*g* are laterally reversed from each other in accordance with the respective viewing angle characteristics, efficient lighting can be performed in accordance with the viewing angle characteristics of the liquid crystal panels 61*b*, 61*g*, and 61*r* for respective colors, thus a bright high-contrast image with reduced color shading and so on can be projected. On this occasion, it is only required to dispose the light source lamp unit 21, the first and second lens arrays 31, 32, and the polarization conversion device 34 included in the lighting optical system 30 the same distance shifted equally in the X direction from the system optical axis SA, and consequently, the incident angle of the lighting beam to the liquid crystal display panels 61b, 61g, and 61r for the respective colors can simply be adjusted.

Second Embodiment

Hereinafter, a projector according to a second embodiment of the invention will be explained. It should be noted that the projector according to the second embodiment is obtained by partially modifying the projector according to the first embodiment, and therefore, is assumed to be the same as the case with the first embodiment unless otherwise explained.

Figure 5:
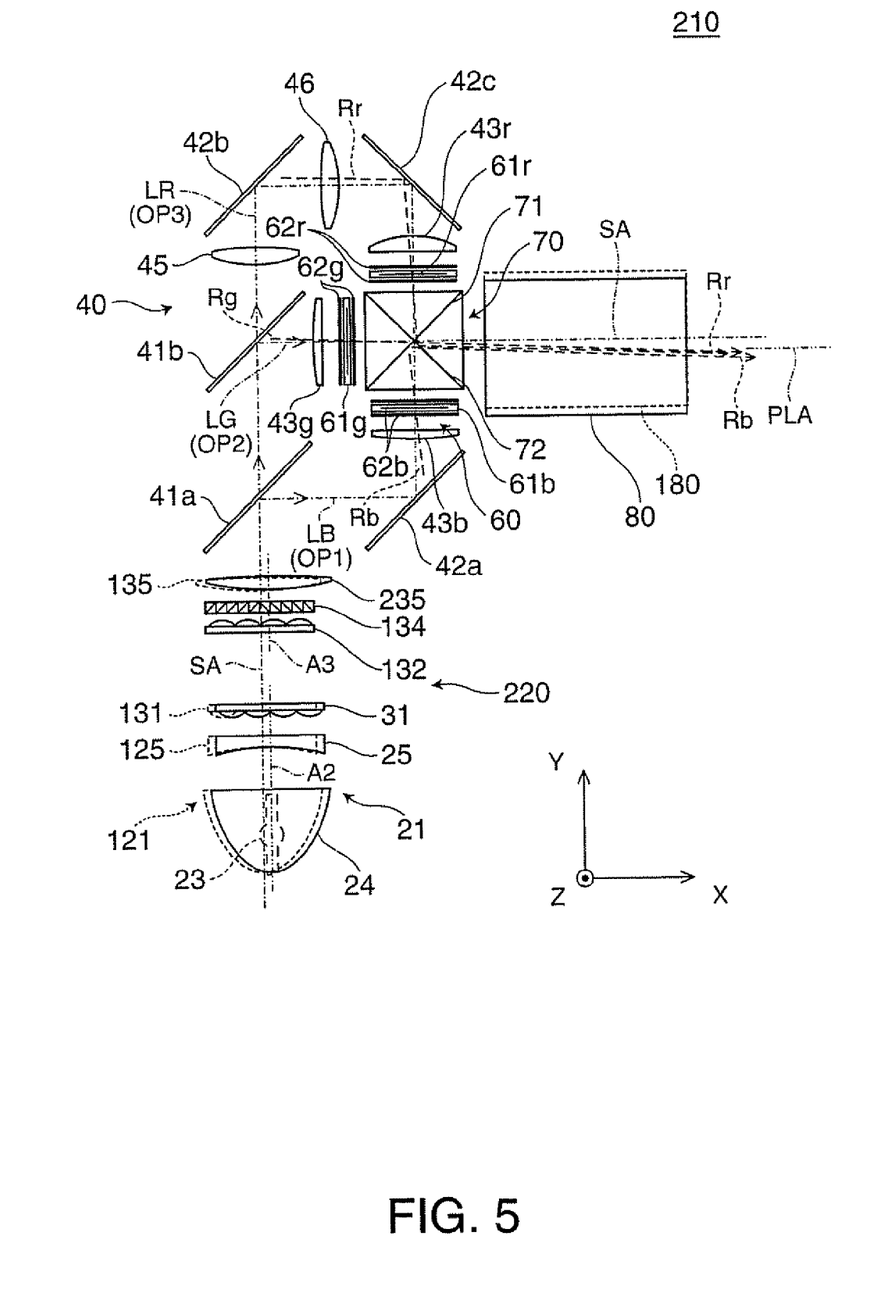
FIG. 5 is a diagram for explaining a projector according to a second embodiment of the invention.

FIG. 5 is a schematic diagram showing an optical system of the projector according to the present embodiment of the invention. In the case with the projector 210, the light source lamp unit 21, the first lens array 31, and the overlapping lens 235 are disposed shifted from the system optical axis SA equally in the X direction in the lighting optical system 220. Specifically, the optical axis A2 common to the light source lamp unit 21 and the first lens array 31 is arranged to be shifted by a predetermined distance from the system optical axis SA equally in the +X direction, and the optical axis A3 of the overlapping lens 235 is also arranged to be shifted by a predetermined distance from the system optical axis SA equally in the +X direction. On the other hand, the second lens array 132 and the polarization conversion device 134 are disposed without being shifted from the system optical axis SA as in the related art. It should be noted that the light source lamp unit 121, the first lens array 131 and the overlapping lens 135 illustrated with dotted lines show a comparative example of the related art type with the optical axes A2, A3 identical to the system optical axis SA.

In the case with the present embodiment, the optical axis A2 of the light source lamp unit 21 and the first lens array 31 and the optical axis A3 of the overlapping lens 235 are arranged to be shifted rightwards (on the +X side on this occasion) with respect to the system optical axis SA. As described above, by shifting the light source lamp unit 21 and so on from the system optical axis SA equally in the +X direction, eccentric light beams should enter the second lens array 132. Thus, there can be achieved the right-leaning condition (a condition in which the light beams are slightly inclined rightward on the light source side) in which the lighting beams emitted from the lighting optical system 20 are inclined or rotated counterclockwise by a predetermined angle, and consequently, the average incident angle of the lighting beams with the image forming areas Ib, Ig, and Ir of the respective colors forming the light modulation section 60 can be arranged to have a necessary amount in accordance with the viewing angle characteristic thereof. Specifically, similarly to the case with the first embodiment, it is possible to have the lighting beams in the right-leaning condition or the left-leaning condition represented by the representative beams Rb, Rg, and Rr enter the image forming areas Ib, Ig, and Ir forming the liquid crystal display panels 61b, 61g, and 61r for respective colors.

Third Embodiment

Hereinafter, a projector according to a third embodiment of the invention will be explained. It should be noted that the projector according to the third embodiment is obtained by partially modifying the projector according to the first embodiment, and therefore, is assumed to be the same as the case with the first embodiment unless otherwise explained.

Figure 6:
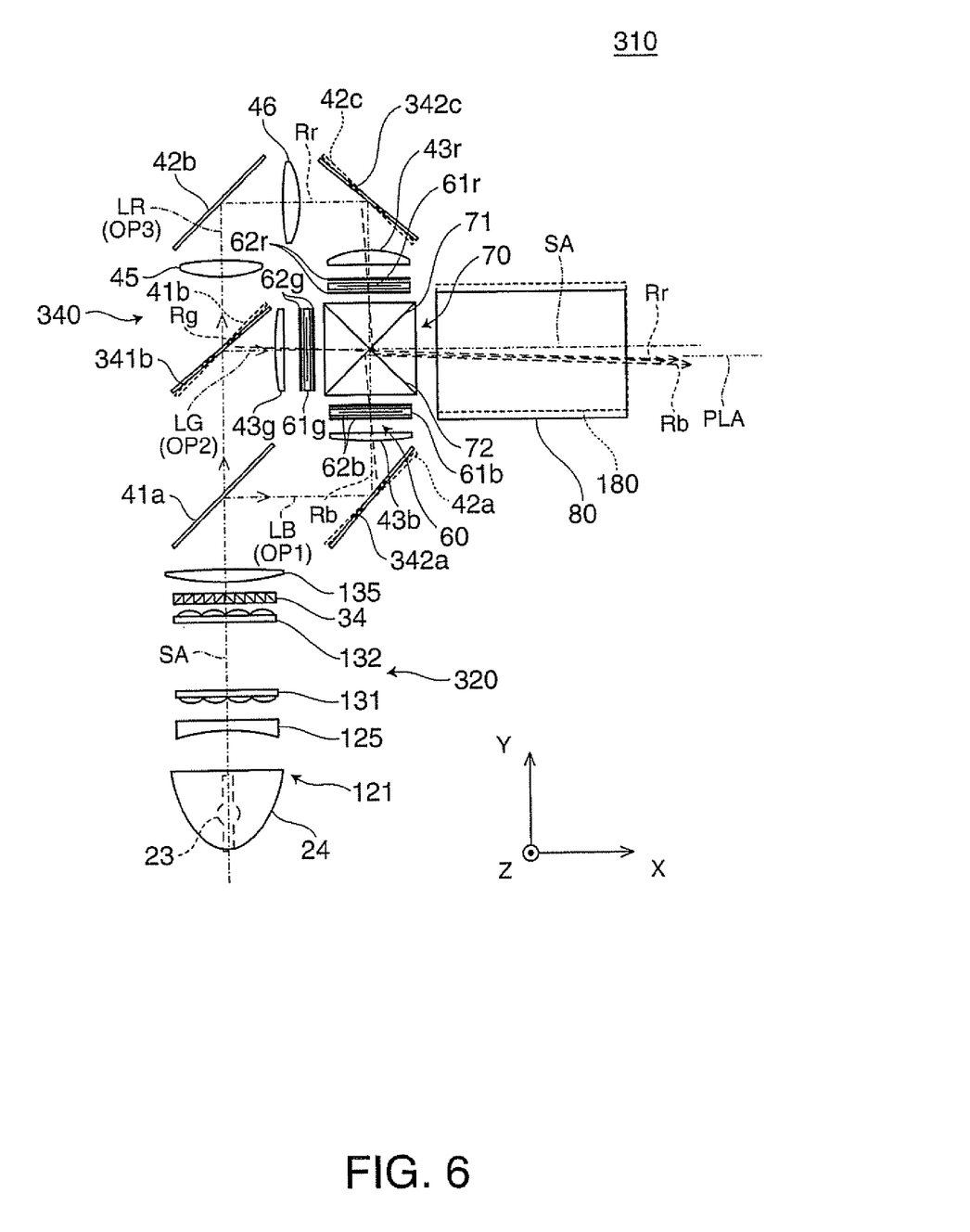
FIG. 6 is a diagram for explaining a projector according to a third embodiment of the invention.

FIG. 6 is a schematic diagram showing an optical system of the projector according to the present embodiment of the invention. In the case of the present projector 310, the mirrors 342a, 342c, and 341b disposed in the anterior stage of the liquid crystal display panels 61b, 61g, and 61r for the respective colors are arranged to be inclined in accordance with the viewing angle characteristics of the liquid crystal display panels 61b, 61g, and 61r for the respective colors. Specifically, regarding the liquid crystal display panel 61b for blue, lighted in the right-leaning condition and combined in the mirror image view condition, the incident angle of the representative beam Rb to the liquid crystal display panel 61b, namely the average incident angle of the lighting beams is adjusted by a predetermined small angle rotating (rotating left-hand) the reflecting mirror 342a counterclockwise when viewed along the −Z direction. Further, regarding the liquid crystal display panel 61g for green, lighted in the left-leaning condition and combined in the normal view condition, the incident angle of the representative beam Rg to the liquid crystal display panel 61g, namely the average incident angle of the lighting beams is adjusted by a predetermined small angle rotating (rotating right-hand) the dichroic mirror 341b clockwise when viewed along the −Z direction, Still further, regarding the liquid crystal display panel 61r for red, lighted in the right-leaning condition and combined in the mirror image view condition, the incident angle of the representative beam Rr to the liquid crystal display panel 61r, namely the average incident angle of the lighting beams is adjusted by a predetermined small angle rotating (rotating left-hand) the reflecting mirror 342c counterclockwise when viewed along the −Z direction. It should be noted that the reflecting mirror 42a, the dichroic mirror 41b, and the reflecting mirror 42c illustrated with the dotted lines show a comparative example of the related art type inclined at an angle of 45° with the system optical axis SA.

Also in the present embodiment, the average incident angle of the lighting beams to the image forming areas Ib, Ig, and Ir for the respective colors forming the light modulation section 60 can be arranged to be inclined as required in accordance with the respective viewing angle characteristics. Specifically, similarly to the case with the first embodiment, it is possible to have the lighting beams in the right-leaning condition or the left-leaning condition represented by the representative beams Rb, Rg, and Rr enter the image forming areas Ib, Ig, and Ir forming the liquid crystal display panels 61b, 61g, and 61r for respective colors.

Although the invention is explained along the embodiments described above, the invention is not limited to the above embodiments. For example, although in the embodiments described above, the liquid crystal display panels 61b, 61r are used in the mirror image view condition, and the liquid crystal display panel 61g is used in the normal view condition, the combination of these conditions can appropriately changed by the arrangement of the liquid crystal display panels 61b, 61g, and 61r in the periphery of the cross dichroic prism 70 or change in the characteristics or the like of the dielectric multilayer films 71, 72.

Further, although in the embodiments described above, the liquid crystal display panels 61b, 61r are lighted in the right-leaning condition and the liquid crystal display panel 61g is lighted in the left-leaning condition, the viewing angle characteristics of the respective liquid crystal display panels 61b, 61g, and 61r can laterally be reversed, and on this occasion, the inclination direction of the lighting beams to the respective liquid crystal panels 61*b*, 61*g*, and 61*r* should be reversed.

Further, although in the embodiments described above, the cross dichroic prism 70 is assumed to be a quadratic prism, the entrance faces of the cross dichroic prism 70 opposed to the respective liquid crystal display panels 61*b*, 61*g*, and 61*r* can also be inclined with respect to the system optical axis SA.

Further, although in the projector 10 of the embodiments described above, the lighting optical system 20 is composed of the light source lamp unit 21, the first and second lens arrays 31, 32, the polarization conversion device 34, and the overlapping lens 35, the lens arrays 31, 32 and the polarization conversion device 34 and so on can be eliminated, and further, the light source lamp unit 21 can also be replaced with another light source such as an LED.

Although in the projector 10 of the above embodiment, the two lens arrays 31, 32 are used for dividing the light beam from the lighting optical system 20 or the like into a plurality of partial light beams, the invention can also be applied to the projectors which do not use such lens arrays 31, 32. Further, the lens arrays 31, 32 can also be replaced with a rod integrator.

Further, although in the embodiments described above, there is used the PBS array for converting the light beam from the light source device and so on into a polarized beam with a specified direction, the invention can also be applied to the projectors which do not use such a PBS array.

Although in the first embodiment and so on described above, the light source lamp unit 21, the first and second lens arrays 31, 32, the polarization conversion device 34, the overlapping lens 235, and so on are disposed so as to be shifted from the system optical axis SA in the lighting optical system 20, it is also possible to dispose these elements so as to be rotated with respect to the system optical axis SA.

Although in the first embodiment and so on, the projection optical system 80 is disposed so as to be shifted from the system optical axis SA, it is also possible to dispose the projection optical system 80 so as to be rotated with respect to the system optical axis SA.

Although in the embodiment described above, an example of the case in which the invention is applied to the transmissive projector is explained, the invention can also be applied to reflective projectors. It should be noted here that "transmissive" denotes that the light modulation device including the liquid crystal panel and the like is a type of transmitting a light beam, and "reflective" denotes that the light modulation device is a type of reflecting a light beam. In the case with the reflective projector, the light modulation device can be composed only of the liquid crystal panel, and accordingly, the pair of polarization plates can be eliminated. It should be noted that the light modulation device is not limited to the liquid crystal panel or the like, but can be a light modulation device using micro-mirrors, for example.

As the projector, a front projector performing image projection from a direction of observing the projection screen and a rear projector performing image projection from the opposite direction of observing the projection screen can be cited, and the configuration of the projector 10 shown in FIG. 1 can be applied to the both types of projectors.

The entire disclosure of Japanese Patent Application No. 2007-068105, filed March 16 is expressly incorporated by reference herein.

What is claimed is:

1. A projector comprising:
a lighting optical system for emitting a lighting beam;
a color separation/light guiding optical system for separating the lighting beam from the lighting optical system into optical paths for three colored light beams;
a plurality of light modulation devices for modulating each of the separated colored light beams in accordance with image information, respectively;
a light beam combining optical system for combining the colored light beams each modulated by the light modulation devices; and
a projection optical system for projecting the light beams output via the light beam combining optical system,
wherein the plurality of light modulation devices includes a normal view type light modulation device and a mirror image view type light modulation device, each of which has a viewing angle characteristic laterally reversed from each other, the viewing angle characteristic being a contrast profile of the light modulation device where the contrast varies based on an inclination direction of an incident light beam,
the colored light beam modulated by the normal view type light modulation device transmits through the light beam combining optical system,
the colored light beam modulated by the mirror image view type light modulation device is reflected by the light beam combining optical system and is laterally reversed, and
at least one optical element included in the lighting optical system and the color separation/light guiding optical system is shifted and/or rotated with respect to a system optical axis such that an average incident angle of the lighting beam to the normal view type light modulation device and an average incident angle of the lighting beam to the minor image view type light modulation device are laterally reversed from each other.

2. The projector according to claim 1,
wherein the optical axis of the projection optical system is disposed so as to be shifted and/or rotated in an average emission direction of the light beams, which are each emitted from the light modulation device for each of the colored light beams and combined by the light beam combining optical system, with respect to the system optical axis passing through the center of an image forming area of the light modulating device for each of the colored light beams.

3. The projector according to claim 1,
wherein the light modulation device for each of the colored light beams is a liquid crystal light valve including a liquid crystal display panel.

4. The projector according to claim 1,
wherein the lighting optical system includes
a light source for emitting a light beam,
a first lens array for dividing the light beam from the light source into a plurality of partial light beams,
a second lens array for individually collecting the light beams from the first lens array, and
an overlapping lens for overlapping the light beams from the second lens array on an image forming area of the light modulation device for each of the colored light beams, and
optical axes of the light source, the first lens array, and the second lens array are shifted from the system optical axis passing through the center of the image forming area of the light modulation device for each of the colored light beams in the same direction.

5. The projector according to claim 1,
wherein the lighting optical system includes
a light source for emitting a light beam, a first lens array for dividing the light beam from the light source into a plurality of partial light beams, a second lens array for individually collecting the light beams from the first lens array, and an overlapping lens for overlapping the light beams from the second lens array on an image forming area of the light modulation device for each of the colored light beams, and optical axes of the light source, the first lens array, and the overlapping lens are shifted from the system optical axis passing through the center of the image forming area of the light modulation device for each of the colored light beams in the same direction.

6. The projector according to claim 4, wherein the color separation/light guiding optical system includes a plurality of mirrors, and in the color separation/light guiding optical system, a difference between the number of times of reflection of a light beam to the normal view type light modulation device and the number of times of reflection of a light beam to the mirror image view type light modulation device is an odd number.

7. The projector according to claim 1, wherein the color separation/light guiding optical system includes a plurality of mirrors, and an average incident angle of the lighting beams to the normal view type light modulation device and an average incident angle of the lighting beams to the mirror image view type light modulation device are laterally reversed from each other in accordance with the respective viewing angle characteristics by rotating at least one of the plurality of mirrors with respect to a lateral direction.

* * * * *